United States Patent
Marsh

(10) Patent No.: US 10,681,989 B2
(45) Date of Patent: Jun. 16, 2020

(54) MARSH SEAT

(71) Applicant: Robert E Marsh, Kansas City, MO (US)

(72) Inventor: Robert E Marsh, Kansas City, MO (US)

( * ) Notice: Subject to any disclaimer, the term of this patent is extended or adjusted under 35 U.S.C. 154(b) by 33 days.

(21) Appl. No.: 16/233,912

(22) Filed: Dec. 27, 2018

(65) Prior Publication Data

US 2019/0200771 A1 Jul. 4, 2019

Related U.S. Application Data

(60) Provisional application No. 62/611,925, filed on Dec. 29, 2017.

(51) Int. Cl.
| | |
|---|---|
| *A47C 9/10* | (2006.01) |
| *A47C 7/00* | (2006.01) |
| *A47C 1/14* | (2006.01) |
| *A01M 31/02* | (2006.01) |

(52) U.S. Cl.
CPC ............... *A47C 9/10* (2013.01); *A01M 31/02* (2013.01); *A47C 1/14* (2013.01); *A47C 7/004* (2013.01); *A47C 7/008* (2013.01)

(58) Field of Classification Search
None
See application file for complete search history.

(56) References Cited

U.S. PATENT DOCUMENTS

| | | | | |
|---|---|---|---|---|
| 2,038,806 | A | * 4/1936 | Sellar | A47C 9/025 |
| | | | | 248/398 |
| 3,312,437 | A | * 4/1967 | Barth | A47C 3/029 |
| | | | | 248/158 |
| 3,381,635 | A | 5/1968 | Pforr | |
| 3,699,913 | A | * 10/1972 | Sautbine | E01F 9/688 |
| | | | | 116/63 P |
| 4,025,107 | A | * 5/1977 | Chippa | A47C 3/029 |
| | | | | 297/17 |
| 4,433,870 | A | 2/1984 | Barren et al. | |
| 5,112,103 | A | * 5/1992 | Downer | A47C 3/029 |
| | | | | 297/188.12 |
| D474,039 | S | * 5/2003 | Zemp | D6/349 |
| 6,877,267 | B2 | * 4/2005 | Burton | A01M 31/06 |
| | | | | 43/2 |
| 7,156,790 | B2 | * 1/2007 | Johnsen | A63B 21/0004 |
| | | | | 482/146 |
| D565,313 | S | * 4/2008 | Johnsen | D6/349 |
| D654,728 | S | * 2/2012 | Gasser | D6/708.17 |
| D681,967 | S | * 5/2013 | Schoolmeester | D6/349 |
| D686,829 | S | * 7/2013 | Elmaleh | D6/352 |

(Continued)

OTHER PUBLICATIONS

Product information for ErgoStool sold by Autonomous, available on Internet on Feb. 1, 2019, https://www.upliftdesk.com/uplift-molion-stool/.

(Continued)

*Primary Examiner* — David E Allred

(57) ABSTRACT

This invention is a seat for use on mud or similar soft surfaces having a spherical base that contacts the soft surface. The spherical base preferably includes a fillable void space configured to be filled with water, mud, or other matter for added weight in the spherical base to maintain the seat in a vertical position.

14 Claims, 2 Drawing Sheets

(56) References Cited

U.S. PATENT DOCUMENTS

| | | | | |
|---|---|---|---|---|
| 8,540,314 B2 * | 9/2013 | Fernandez | | A47C 9/002 |
| | | | | 297/314 |
| D716,570 S * | 11/2014 | Keen | | D6/349 |
| 8,998,319 B2 * | 4/2015 | Bahneman | | A47C 9/00 |
| | | | | 297/195.11 |
| D745,287 S * | 12/2015 | Chadwick | | D6/352 |
| D746,073 S * | 12/2015 | Elmaleh | | D6/349 |
| D748,924 S * | 2/2016 | Walser | | D6/352 |
| 9,301,614 B1 | 4/2016 | Christopher et al. | | |
| D764,200 S * | 8/2016 | Elmaleh | | D6/349 |
| D767,312 S * | 9/2016 | Walser | | D6/708.17 |
| 9,737,745 B2 * | 8/2017 | Hugou | | A47C 3/029 |
| D801,064 S * | 10/2017 | Von Boetticher | | D6/352 |
| D801,714 S * | 11/2017 | Elmaleh | | D6/352 |
| D803,592 S * | 11/2017 | Lenz | | D6/349 |
| D806,414 S * | 1/2018 | Elmaleh | | D6/352 |
| 9,883,748 B2 * | 2/2018 | Murray | | A47C 9/002 |
| 9,894,998 B2 * | 2/2018 | Walser | | A47C 3/02 |
| D812,387 S * | 3/2018 | Bahneman | | D6/352 |
| 9,931,556 B2 * | 4/2018 | Cosma | | A63B 69/04 |
| D823,624 S * | 7/2018 | Elmaleh | | D6/716 |
| 10,219,632 B2 * | 3/2019 | Mengshoel | | A47C 3/027 |
| 10,543,390 B2 * | 1/2020 | Hugou | | A47C 9/025 |
| 2003/0164633 A1 * | 9/2003 | Jakus | | A47C 9/002 |
| | | | | 297/271.5 |
| 2007/0138850 A1 * | 6/2007 | Oettinger | | A47C 3/029 |
| | | | | 297/271.5 |
| 2009/0001788 A1 * | 1/2009 | Lenz | | A47C 9/002 |
| | | | | 297/217.4 |
| 2011/0221255 A1 * | 9/2011 | Weber | | A47C 3/029 |
| | | | | 297/452.21 |
| 2011/0283454 A1 * | 11/2011 | Springer | | A61G 15/005 |
| | | | | 5/602 |
| 2012/0311779 A1 * | 12/2012 | Morelock | | A47K 3/127 |
| | | | | 4/572.1 |
| 2015/0351549 A1 * | 12/2015 | Chadwick | | A47C 3/029 |
| | | | | 297/311 |
| 2017/0303691 A1 * | 10/2017 | Jen | | A47C 9/002 |
| 2018/0236293 A1 * | 8/2018 | Chiu | | A47C 9/002 |

OTHER PUBLICATIONS

Product information for Motion Stool sold by Uplift Desk, available on Internet on Feb. 1, 2019, https:J/www.sears.com/vifah-autonomous-ergostool-height-adjustable-active-sitting-office/p-00840314000P.

* cited by examiner

MARSH SEAT

BACKGROUND OF THE INVENTION

This invention is an improved seat for use on mud or similar soft surfaces. The most common application for this type of seat is for duck hunting in a marsh. Over the years many inventions have attempted to address the need for an effective seat for duck hunting. U.S. Pat. No. 9,301,614 (Christopher) provides a review of the wide range of prior inventions attempting to address this need. Use of a seat on a soft surface like mud is a very different use than on a hard surface, and rarely, if ever, would a chair that is suitable for a hard surface also be suitable for use on a soft surface. A completely different approach to seat design is necessary for these different surfaces.

The novel element of this invention is a unique approach to the base of the seat—where the seat structure contacts the mud or other soft surface. The prior art solutions have proposed different configurations of seats and vertical posts, but almost all use similar structures where the seat contacts the mud of the marsh. Most use a pointed stake at the end of the vertical post for placement in the mud. A few have expanding "feet" that attempt to stabilize the vertical post in mud. All have limited effectiveness. Several prior inventions, such as those in U.S. Pat. No. 3,381,635 (Pforr) and U.S. Pat. No. 4,433,870 (Bairen) have suggested a flat base rather than a pointed stake at the base. Even the invention of the Christopher patent attempted to improve the base by using a wider stake profile. But none of these inventions are effective on an uneven, soft mud surface (which may be above or below the water level). A pointed stake inserted into mud, even if it has expanding feet, quickly loosens with side-to-side movement (which is inevitable) and becomes unstable. A flat base is also highly ineffective and unstable on an uneven, soft mud surface.

SUMMARY OF THE INVENTION

This invention is a seat for use on mud or similar soft surfaces having a spherical base that contacts the soft surface. The spherical base preferably includes a fillable void space configured to be filled with water, mud, or other matter for added weight in the spherical base to maintain the seat in a vertical position.

DETAILED DESCRIPTION OF THE INVENTION

Figure 1:
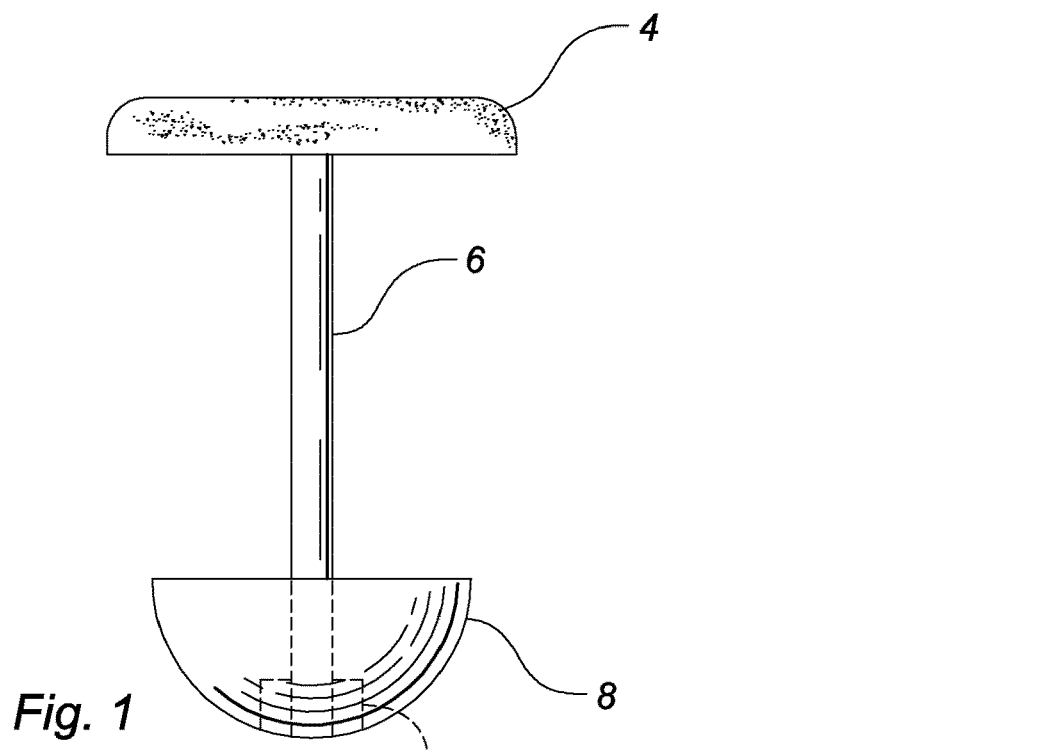
FIG. 1 shows a side view of one embodiment of the invention.

The novel approach of this invention is to accept that there will be side-to-side movement of the seat, and accommodate for that movement with a base that presents a spherical surface against the mud or similar soft surface. As shown in FIG. 1, this invention comprises a seat pad 4 attached to the top of a vertical post 6 with a spherical base 8 attached or attachable at the bottom of the vertical post 6. The spherical base 8 has a spherical lower surface that rests against the mud or other soft surface. The spherical base 8 preferably includes a structure such as a sleeve 12 for receiving the vertical post 6.

Some prior art seats, such as the seat described in the Christopher patent, consider the ability of the seat to float as a positive. But in the context of this invention, adequate weight in the spherical base is important to keep the seat in an essentially vertical position and to afford stability, and the seat should not float. At the same time, in this outdoor application, carrying a seat with a heavy base is not desirable, and so this invention is designed to reduce the weight of the seat while still maintaining its effectiveness.

While this invention may be criticized as a seat that wobbles, in fact all of the prior art duck hunting seats wobble—in a way that is unpredictable and gradually worsens during use. The present invention wobbles predictably and in a way that the user becomes accustomed to and learns to use safely and effectively. In fact, there is an advantage to this kind of "active" sitting that is particularly appropriate in an outdoor hunting setting, where agility and readiness to stand is important.

Referring to FIG. 1, a seat pad 4 may be cushioned or may be hard, using materials such as aluminum, plastic, fabric, foam padding and other materials well known in the art. The vertical post 6 supports the seat pad 4 and has a cross section that may be circular, square or other known cross section shapes. The vertical post 6 may be constructed of materials such as aluminum, steel, wood, plastic and other materials well known in the art. The key element of this invention is the spherical base 8 which has a spherical lower surface (and hence is referred to in this description as the "spherical base").

Figure 2:
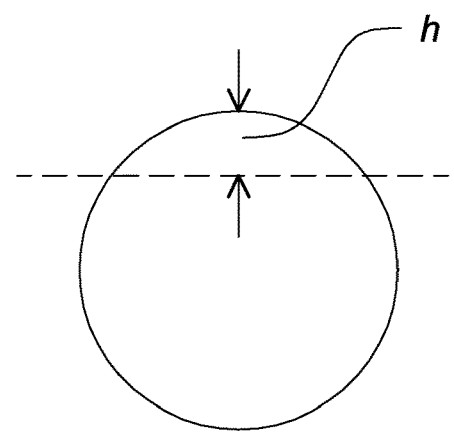
FIG. 2 is a depiction of a sphere segment to aid in the understanding of the invention.
Figure 3:
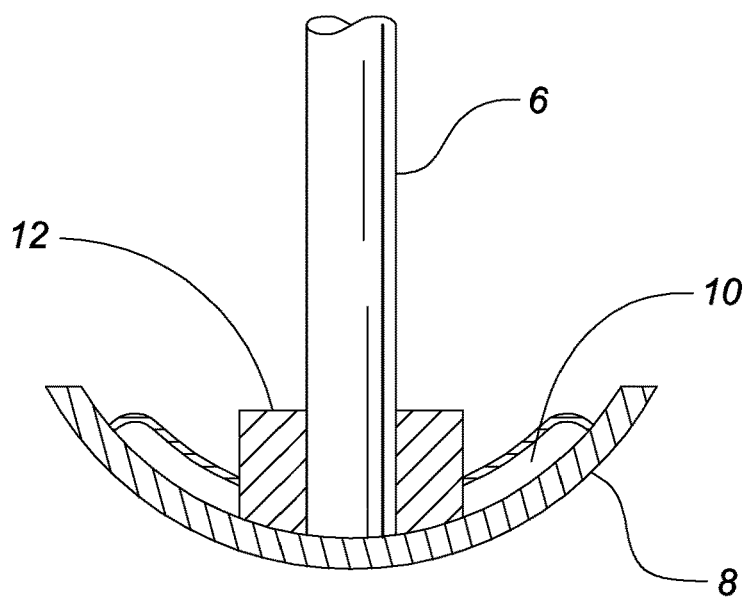
FIG. 3 is a cross section of the spherical base in one embodiment of the invention.
Figure 4:
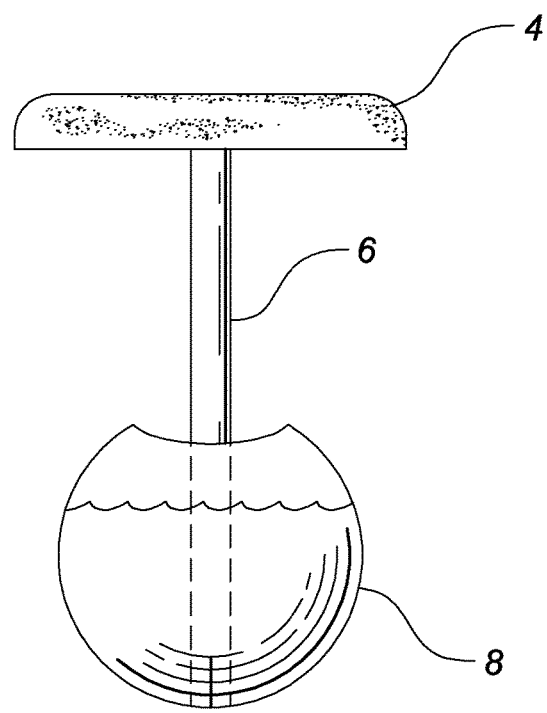
FIG. 4 shows a side view of one embodiment of the invention.
Figure 5:
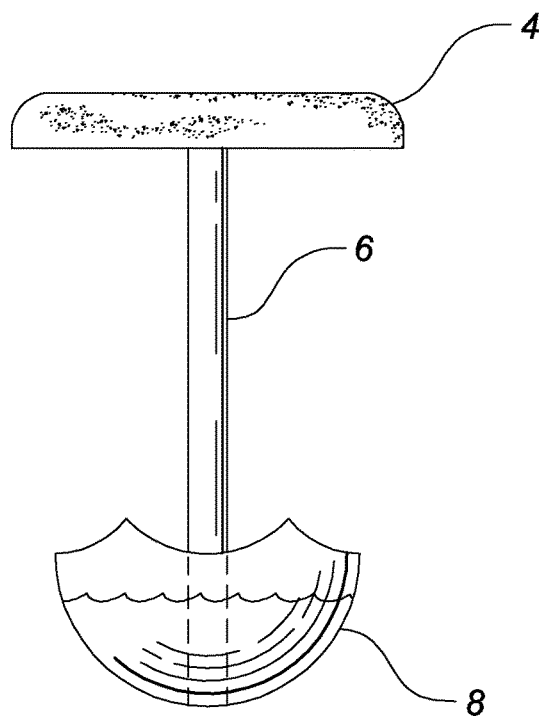
FIG. 5 shows a side view of one embodiment of the invention.

The term "spherical segment" means a portion of a sphere cut off by a plane. For purposes of this description, the height "h" of the spherical segment refers to the distance from the plane that cuts the sphere to the outer surface of the sphere, as shown in FIG. 2. A spherical segment that passes through the center of a sphere (where the height of the spherical segment is equal to the radius of the sphere) is called a hemisphere. The spherical base of the present invention may include a hemisphere, as approximately shown in FIG. 1, or it may include a spherical segment that is less than a hemisphere (with the height of the spherical segment less than the radius of the sphere) or the base may include a spherical segment that is more than a hemisphere (with the height of the spherical segment greater than the radius of the sphere). In fact, the spherical base could include virtually a complete sphere. FIGS. 3 and 4 show different shapes of the spherical base of the present invention. The spherical base of this invention is configured such that the referenced sphere would have a center above the base—in other words the base would present a convex (not a concave) lower face to the mud or other soft surface. To constitute a spherical base for purposes of this description, only the portion contacting the mud or soft surface needs to be substantially spherical. The base shape above the substantially spherical surface may have other configurations, including flat, square, round, hexagonal, etc. Similarly, above the spherical portion could be other structural features, not necessarily spherical, and the vertical post may be affixed to these features (either removably or more permanently). FIG. 5 shows an example of such an alternate configuration. The portion of the spherical base contacting the mud or other soft surface should be substantially spherical. For example, a convex polyhedron (such as a truncated icosahedron) with enough faces to substantially behave as a sphere in contact with mud or another soft surface would be considered substantially spherical.

A critical element of this invention is the management of the overall weight of the seat while maintaining a low and stable center of gravity when in use. Most prior art mud seats have a high center of gravity and if the structure inserted into the mud becomes loose, then the seat tips over. In the present invention, suitable weight in the spherical base it is important to keep the seat in a vertical position. In use the spherical base may be submerged in water, and the water displaced will create an upward buoyancy force on the spherical base and, unless sufficient weight is present, cause the seat to tip over from the desired vertical position. While this issue in the present invention (with a spherical base) could be solved by adding substantial permanent weight to the spherical base, this addition would lead to a heavy seat that would be inconvenient to transport into position.

It is important that the spherical base have sufficient weight for proper stability. The most appropriate weight for the spherical base is a function of the weight of the other seat components and the height of the vertical post. The spherical base must be heavy enough to keep the seat in a vertical position. Since in at least some applications the entire spherical base would be below water level, the buoyancy of the spherical base must be taken into account. In a preferred embodiment of this invention, in order to reduce the weight of this invention while it is being transported into position, a void space would exist within the spherical base that may be filled with water, mud, sand, rocks, or other materials to provide additional weight. The spherical base is configured so that the fillable void space may be easily emptied to lighten the seat for transport. This configuration takes advantage of the fact that the seat is typically used in a setting with ready access to water and/or mud. The concept of the fillable void space helps address the weight and stability concerns by utilizing the meaningful weight of water or mud to its advantage. It is also important that the weight of the other components of the seat, including the seat pad and vertical post, be as light as possible, so that substantial weight in the spherical base is not necessary to maintain a sufficiently low center of gravity.

In the embodiment shown in FIG. 3, the height of the spherical segment is about one half the radius of the sphere. This would be a desirable configuration for some applications. In the embodiment shown in FIG. 4, the height of the spherical segment is about 1.75 times the radius of the sphere. This configuration would be preferable in certain situations because the spherical base holds a substantial amount of water (for additional weight in the base).

FIG. 3 also shows an enclosure at the bottom interior of the spherical base that may be filled with sand, concrete or other suitable heavy material to constitute a weighted enclosure 10 to further lower the center of gravity of the invention. The weighted enclosure is different than the fillable void space in that the weighted material in the weighted enclosure is either not removable by the user or is not easily removable in the field, versus the fillable void space that is intended to be easily filled (and emptied) of water, mud, or other materials at the time of use in the field.

As shown in FIG. 1, the spherical base 8 preferably includes a structure such as a sleeve 12 for receiving the vertical post 6. The sleeve 12 may include structures for attachment to the vertical post 6 (so that the vertical post can be used to lift and move the base) such as biased pins that engage holes in the sleeve 12 (or various other connection structures known in the art). Alternatively, the sleeve 12 may receive the vertical post 6 loosely without rigid attachment. It is desirable that as much of the weight as possible be at the lowest part of the spherical base 8. In the configuration shown in FIG. 3, a weighted insert 10 is incorporated in the structure of the spherical base 8 in a manner known in the art and is preferably centered at the bottom of the spherical base to provide a molded watertight enclosure filled with sand or other weighting material. The weighted insert 10 may incorporate the sleeve 12 provided for receiving the vertical post 6.

Various approaches to the fillable void space may be used. One configuration would be an almost completely enclosed spherical base with only an opening for filling and emptying the fillable void space. At the other extreme, the fillable void space could be completely open at the top, with no enclosure across the opening of the sphere segment. In the latter configuration, as shown in FIG. 3, the spherical base would be filled with water or mud by simply submerging it, and in the case of mud, tipping it side to side to fill the void space. Between these two extremes, various levels of enclosure are contemplated, with one such configuration shown in FIG. 5.

Figure 6:
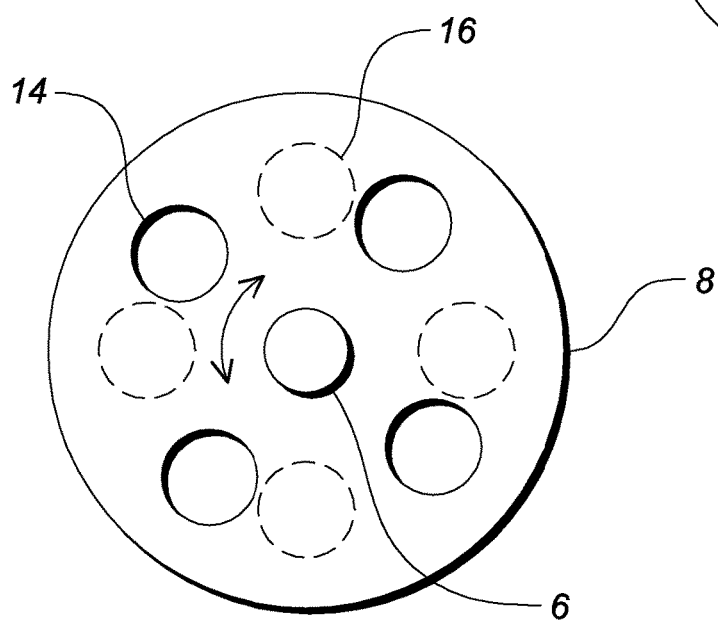
FIG. 6 shows the top of the spherical base in one embodiment of the invention.

FIG. 6 shows a top view of the spherical base 8 having a top enclosure with openings 14 in the top of the spherical base 8 through which water may enter the fillable void space of the spherical base 8. The spherical base 8 may include covers 16 to close these openings 14 so that the spherical base 8 will dependably hold water as would be desirable when it is used in a location above the water level. The covers 16 are rotatably mounted so that when rotated the openings 14 are opened or closed. In this configuration, the weight of the empty spherical base 8 may be significantly reduced, since adequate weight will be provided when it is filled with water, particularly when the seat is used on mud above the water level.

Another configuration of the spherical base includes holes in the bottom of the spherical base to let water into the fillable void space inside the spherical base. As long as the spherical base is submerged, the water would remain inside the spherical base and provide the desired weight. In this approach, if the fillable void space is substantially enclosed, it is desirable to also have holes on the upper surface of the spherical base to allow air to escape as water enters the fillable void space through the bottom holes.

In an application where the seat would rarely be moved far once it is in position, the fillable void space in the spherical base may be filled with sand, concrete, or a similar heavy weighting material. In this situation, the seat can be left in position, particularly if configured with a removable vertical post and/or seat pad so that those components may be removed and only the spherical base (and possibly the vertical post) would be left in position. In this situation, particularly for a below water level use, a floating indicator should be attached to the spherical base so it can be located in the future.

The spherical base may be constructed of metal (such as aluminum or steel), plastic, or other materials. When less weight is desired, the spherical base should be constructed of a lighter weight material (preferably plastic) and be configured to hold a larger amount of water or mud in the fillable void space. In this situation, the appropriate spherical base configuration would preferably be more than a hemisphere. In the configuration shown in FIG. 4, the spherical base is almost a complete sphere with the top of the sphere open. In this embodiment, water may be allowed to enter the base through the top of the sphere and be largely contained in the spherical base without need for closure structure. A sleeve 12 for receiving the vertical post 6 is also shown in FIG. 1 and FIG. 3.

FIG. 5 shows another spherical base configuration where most of the needed weight is provided by water, but only the bottom portion of the base is spherical. As discussed above, the spherical base may be open at the top, or may be fully enclosed or covered, or may have openings and covers as shown in FIG. 6. Another embodiment would have a partially covered fillable void space, with partial covering of at least 50% of the area of the corresponding spherical segment circle being desirable.

As an example of an embodiment of the invention, a plastic spherical base with a volume of about ⅛ of a cubic foot is provided, with a fillable void space comprising half of that volume. The dimension "h" of the sphere segment of the spherical base is 6 inches. When the fillable void space is filled with water the spherical base weights about 10 pounds. The spherical base is 14 inches in diameter. The seat pad is round and is 10 inches in diameter. An adjustable vertical post is provided that permits adjustment of the height from the bottom of the spherical base to the seat pad to between 20 and 30 inches.

Other elements that could be included with the present invention are known in the art and are reflected in the wide variety of prior art inventions, such as those described in the Christopher patent. For example, the vertical post may be detachable from the base, and the seat may be detachable from the vertical post using various connections well known in the art. The vertical post length may be adjustable. The seat may fold or rotate (although with the spherical base, a rotatable seat is unnecessary and generally undesirable). It is desirable that the spherical base be as large as practical, but not so wide that it extends under the feet of a user sitting on the seat—because it is important that the user's feet contact the ground for stability (even if the ground is soft, uneven, muddy, or under water). Ideally the diameter of the spherical base would be less than 24 inches.

I claim:

1. A seat for use on a soft surface comprising:
    a spherical base that includes at least a semi-spherical bottom portion for engaging the soft surface,
    a vertical post mounted on an upper surface of the spherical bottom portion, and
    a seat pad supported atop the vertical post for supporting a seat occupant,
    wherein said spherical base has a fillable void space and a plurality of holes in the bottom portion of said spherical base for enabling water to enter the fillable void.

2. The seat in claim 1 with said spherical base having a weighted insert within said spherical base.

3. The seat in claim 2 with said weighted insert centered at the bottom of said spherical base.

4. The seat in claim 1 wherein said fillable void space is substantially uncovered.

5. The seat in claim 4 wherein said fillable void space comprises an inner volume of said spherical base.

6. The seat in claim 1 wherein said fillable void space is substantially enclosed.

7. The seat in claim 6 further comprising at least one opening in an upper surface of said substantially enclosed fillable void space.

8. The seat in claim 7 further comprising at least one closure to substantially cover said at least one opening.

9. The seat in claim 1 wherein said fillable void space is at least partially covered.

10. The seat in claim 1 further comprising a sleeve in said spherical base for removable attachment of said vertical post.

11. The seat in claim 1 wherein the volume of said fillable void space is at least 50% of the volume of said spherical base.

12. The seat in claim 11 wherein said fillable void space is substantially uncovered.

13. The seat in claim 11 wherein said fillable void space is substantially enclosed.

14. The seat in claim 11 wherein said fillable void space is at least partially covered.

* * * * *